Jan. 23, 1962 R. W. KAASE ET AL 3,018,090
HEAT EXCHANGER FITTINGS
Original Filed Aug. 21, 1951 2 Sheets-Sheet 1
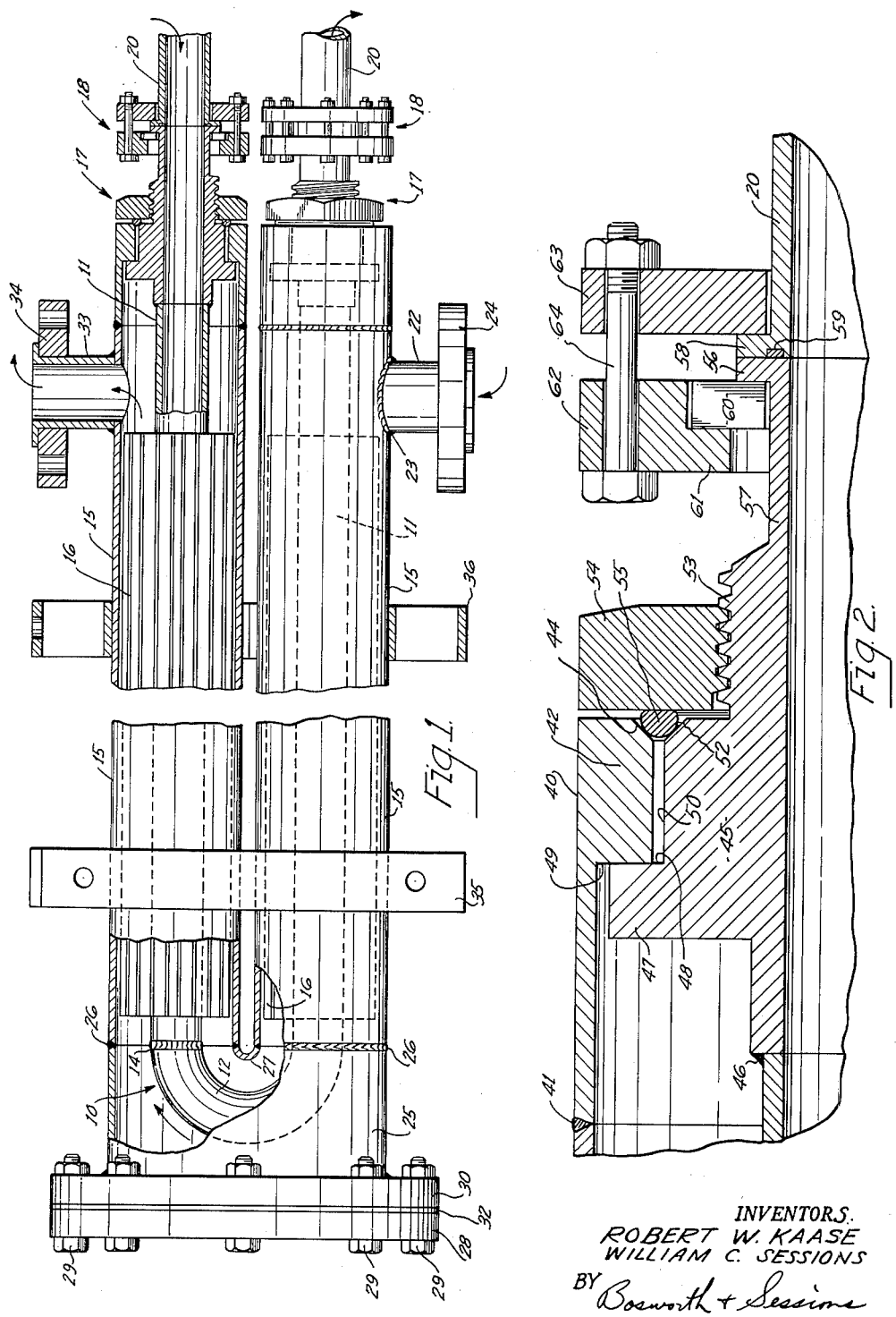
INVENTORS.
ROBERT W. KAASE
WILLIAM C. SESSIONS
BY Bosworth + Sessions
ATTORNEYS.

INVENTORS.
ROBERT W. KAASE
WILLIAM C. SESSIONS
BY Bosworth & Sessions
ATTORNEYS.

ent Office 3,018,090
Patented Jan. 23, 1962

3,018,090
HEAT EXCHANGER FITTINGS
Robert W. Kaase, Bay Village, and William C. Sessions, Lakewood, Ohio, assignors to Fintube Company, Elyria, Ohio, a corporation of Ohio
Continuation of abandoned application Ser. No. 242,952, Aug. 21, 1951. This application June 2, 1955, Ser. No. 512,614
7 Claims. (Cl. 257—247)

This invention relates to tubular connections or unions and particularly to devices for making a nonrotatable connection between two tubes or pipes of different diameters. The connections disclosed herein are especially useful in heat exchangers, and are described herein as adapted for use in one type of heat exchanger. It is to be understood, however, that the connections may be employed for other purposes. This application is a continuation of our co-pending application Serial No. 242,952 filed August 21, 1951 now abandoned.

A general object of the invention is to provide an efficient connection for joining tubes of different diameters which can be manufactured at relatively low cost and which will withstand extremely high pressures without leakage. Another object is to provide such a connection which can be readily assembled or disassembled without requiring any special tools or equipment. Another object is to provide such a connection in which no ground joints are required, the sealing preferably being by means of a gasket. Another object is to provide a connection in which the sealing gaskets can be readily renewed. A further object is to provide a connection in which the sealing surfaces may be easily inspected and cleaned immediately prior to sealing. A further object is to provide a compact connection particularly adapted to seal an inner tube to an outer tube with the connecting elements not substantially exceeding the diameter of the outer tube, whereby a pair of tubes embodying the connections can be closely spaced.

Figure 3:
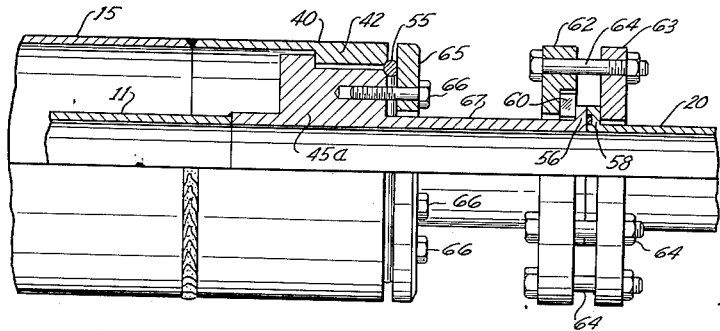
Figure 4:
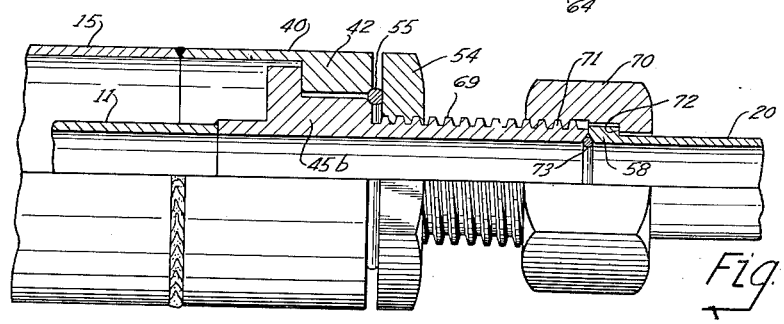
Figure 5:
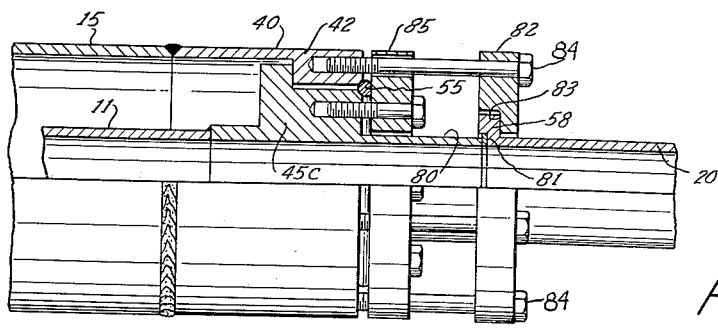
Figure 6:
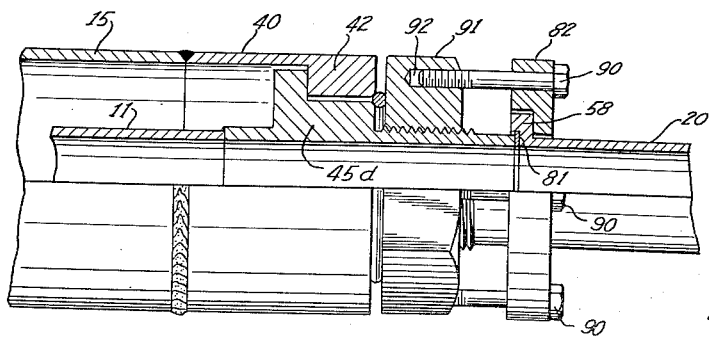

Further objects and advantages of the invention will become apparent from the following description of a preferred form thereof, reference being made to the accompanying drawings in which FIGURE 1 is an elevation partly in section showing a double tube heat exchanger made according to our invention and FIGURE 2 is a fragmentary cross-section on an enlarged scale through one of the fittings embodying our invention and incorporated in the heat exchanger of FIGURE 1; FIGURE 3 is a longitudinal section of part of the exchanger showing a modified form of connection between components of the exchanger; FIGURE 4 is a section similar to FIGURE 3 showing another modified connection between parts of the exchanger wherein the connecting pipe is secured to the fitting by means of a threaded collar; FIGURE 5 is a section showing another modified connection wherein the clamping ring on the connecting pipe is secured by screws to the outer tube; and FIGURE 6 is similar to FIGURE 5 except that the clamping ring is secured by screws to the nut on the fitting.

In the drawings we have illustrated a heat exchanger designed to employ preferred forms of our tubular connection or union. This heat exchanger is of the hairpin type and comprises an inner hairpin or U-tube indicated generally at 10 and made up of two straight portions 11 and a return bend 12 welded together as indicated at 14, although unions or other means for connecting the return bend and the straight portions may be employed if desired. Shell tubes 15 surround the straight portions 11 of the hairpin tube 10. In order to increase the rate of interchange of heat between the commodity within the tube 10 and the commodity surrounding this tube and within the shell tubes 15, the straight portions 11 are preferably provided with fins 16 constructed in accordance with the teaching of Patent No. 2,261,136 and No. 2,261,137 issued to John W. Brown, Jr. and assigned to the assignee of this application.

The straight portions 11 are provided at their outer or exposed ends with connections or unions indicated generally at 17 by means of which the inner tubes are connected to the outer tubes as will be explained in greater detail hereinafter. Fittings indicated in general at 18 and associated with the unions connect the inner tube to connecting pipes which serve as inlet and outlet conduits for the hairpin tube. The other commodity may be supplied to the interior of the lower shell tube 15 through the inlet pipe 22 welded to the shell tube as shown at 23 and provided at its end with a conventional flanged connection 24. Fluid supplied through the inlet 22 flows in the direction of the arrows to the rear end of the exchanger where the tubes are connected together by a closure means or connecting member 25 welded to the ends of the tubes as indicated at 26, and an elbow 27 welded to the tubes. A removable cover plate 28 is secured by bolts 29 to the flange 30 which is welded to the member 25. A suitable gasket 32 may be provided between the cover plate and the flange in order to make a leak-proof connection. The connecting member 25 may be cylindrical as shown or alternately may consist of a U-shaped end housing or cover removably secured to the shell tubes. Thus fluid may flow to the rear of the heat exchanger through the lower tube 15 around the outside of the return bend 12 and into the upper tube 15, thence within the upper tube 15 to the outlet pipe 33 which, like the inlet pipe 22, is provided with a conventional flanged union 34. With such an arrangement, counterflow of the commodities in the inner and outer tubes will take place. If desired, concurrent flow may be obtained by reversing the inlet and outlet connection for either the inner tube or the outer tubes. Several exchangers may be connected together in series if desired, and may be supported by brackets 35 and 36.

One of the connections or unions 17, together with its associated fitting 18, which we provide for making the necessary connection between the ends of the shell tubes 15 and the legs 11 of the hairpin or U-tube is shown on an enlarged scale in FIGURE 2. This connection between the shell tube and the hairpin tube must be leak-proof under widely varying temperature conditions, must accurately position the tubes with respect to each other and must be designed so that it can be assembled and disassembled without difficulty. In order to obtain these results, the end of the shell tube 15 is provided with an end fitting 40 which is preferably formed separately from the shell tube and welded thereto as indicated at 41. As shown in the drawing, end fitting 40 preferably is of substantially the same internal and external diameters as the shell tube 15. Fitting 40 has an inwardly extending end flange 42 providing an inwardly facing shoulder 49 disposed substantially at right angles to the axis of the shell tube 15 and an outer, preferably conical and outwardly flared, sealing surface 44.

A co-operating fitting 45 is secured to the end of the inner finned tube 11 as by welding at 46. Fitting 45 has an outwardly extending flange 47 of greater diameter than the internal diameter of inwardly extending flange 42 of the shell fitting 40; thus, the outwardly facing right angled shoulder 48 on the fitting 45 engages the inwardly facing shoulder 49 on fitting 40 and limits outward movement of straight portion 11 of the inner tube 10 with respect to the shell tube. Next, fitting 45 is provided with a cylindrical portion 50 of slightly less diameter than the internal diameter of flange 42 and of substantially the same length as flange 42 so that when shoulder 48 engages shoulder 49 the outwardly facing sealing surface 52 at the end of cylindrical portion 50 is disposed adjacent sealing surface 44 on the shell fitting 40. The sealing surface 52 is preferably conical and inwardly flared; preferably the conical sealing surfaces 44 and 52 are disposed at angles of about 45° to the axis of the tubes and fitting members so that the two sealing surfaces extend substantially at right angles to each other.

Beyond the sealing surface 52, the inner fitting 45 is reduced in diameter slightly and is threaded as indicated at 53 to receive clamping nut 54. A gasket 55, which is preferably a soft iron ring if the exchanger is intended for high pressure and high temperature service, is interposed between the inner face of nut 54 and the sealing surfaces 44 and 52. With this arrangement, it will be evident that by tightening the clamping nut 54, the gasket can be clamped into firm sealing engagement with sealing surfaces 44 and 52, the shoulder 48 engaging shoulder 49 to provide a stop which takes the reaction of the clamping pressures. Thus, in assembling the heat exchanger, it is only necessary to insert the hairpin tube within two shell tubes, then to tighten up the nuts 54 of each of the connections 17 to clamp the gaskets 55 into leak-proof engagement with the sealing surfaces. The sealing surfaces may be inspected and cleaned if necessary, immediately before the gasket is clamped against them and the joint may be inspected at any time.

In order to connect the straight portions 11 of the inner tube to the connecting pipes 20, the fitting 45 in each joint extends beyond the threaded portion 53 and terminates in a sealing flange 56, the intermediate portion of the fitting being reduced in diameter as at 57. Connecting pipe 20 is provided with a co-operating sealing flange 58, a gasket 59 being interposed between the sealing flanges if desired. A split ring 60 is disposed between flange 56 and inwardly extending flange 61 of clamping ring 62; clamping ring 63 directly engages flange 58 of connecting pipe 20. Clamping rings 62 and 63 are secured together by means of bolts 64 so that the joint between flanges 56 and 58 can be readily completed. It will be noted that when the bolts 64 are loosened, the split ring 60 can be removed and clamping ring 62 slipped over flange 56. Also flange 56 is of lesser diameter than the opening in clamping nut 54 so that the nut and gasket 55 can be removed from the assembly by passing them over flange 56. With these elements removed, the hairpin tube 10 can be withdrawn from the assembly after cover plate 28 is removed.

FIGURE 3 illustrates a modified form of the invention in which the means for connecting the ends of the hairpin tube to the shell comprise a ring element 65 mounted adjacent fitting 45a and flange 42 and adapted to be drawn into tight engagement with gasket 55 by means of a plurality of screws 66 which extend longitudinally through the ring 65 and into fitting 45a as shown. With this form of connection, the portion 67 of the fitting 45a ahead of the sealing surfaces is straight and of uniform diameter somewhat less than the internal diameter of ring 65. By drawing up on screws the ring 65 is pressed against gasket 55 which seals the connection as described above. By utilizing a plurality of relatively small screws 66, the tightening operation can be carried out by means of a small wrench and the assembly is not subjected to excessive torque. This type of connection is particularly advantageous in larger sizes of heat exchangers. The connecting pipe 20 is secured to the fitting 45a in the manner described in connection with FIGURES 1 and 2.

In FIGURE 4 is shown another form of construction for connecting the straight portions 11 of the inner tubes to the connecting pipes 20. As shown, the reduced portion 69 of fitting 45b is threaded throughout its length, there being no flange at the end thereof adjacent the connecting pipe. A nut 70 which is adapted to span the juncture of the connecting pipe and the fitting is provided with internal threads 71 which engage the threaded portion 69 of the fitting and an internal shoulder 72 which engages flange 58 on the end of the connecting pipe. It will be seen that when nut 70 is rotated, it will be advanced toward the fitting by engagement with the threaded portion 69 thereof and will press the ends of the connecting pipe and the fitting into tight sealing engagement with each other through the clamping action of shoulder 72 on the flange 58. Gasket 73 provides an effective seal between these two parts.

In FIGURE 5 is shown a modification of the fitting shown in FIGURE 3. In this case the reduced portion 80 of the fitting has no end flange and is adapted to fit into a recess 81 formed in the adjacent end surface of connecting pipe 20. The clamping ring 82 on connecting pipe 20 has an inwardly facing shoulder 83 which is adapted to engage the flange 58 on connecting pipe 20 so as to clamp the end of the connecting pipe to the fitting when ring 82 is drawn toward the fitting. A plurality of elongated screws 84 extending through clamping ring 82, ring 85 on the fitting 45c and into threaded engagement with the inwardly extending flange 42 of the outer tube provide the means for drawing the clamping ring 82 toward the fitting. By this construction, the need for additional clamping means on the end of the fitting is obviated without reducing the strength of the connection.

In FIGURE 6 is shown a modification of the construction of the exchanger illustrated in FIGURES 1 and 2. Here as in FIGURE 5, the end of the fitting 45d has no flange and is adapted to fit into the recess 81 of the flange 58 on connecting pipe 20. The clamping ring 82 is drawn tightly against flange 58 toward the fitting by screws 90 which abut against and extend longitudinally through the clamping ring 82 and into threaded engagement with the nut 91 on the fitting, the nut being drilled and tapped as at 92 for that purpose. Thus, when nut 91 is drawn up tightly against the gasket 55 and clamping ring 82 is likewise secured to the nut by means of screws 90, the connecting pipe will be securely held against the end of the fitting.

From the foregoing description of a preferred form of the invention it will be apparent that we have provided simple and effective tubular connections that are particularly adapted for severe service such as in heat exchangers and the like. Our connections are relatively simple and compact. The elements making up the connections need not exceed the diameter of the outer tube, hence, compact arrangements of tubes can be utilized, a feature that is of particular advantage in the manufacture of heat exchangers. The sealing surfaces may be inspected and cleaned immediately before sealing and the joints are readily accessible at all times. Furthermore, leakage of neither the joint between the inner tube and the outer tube nor of the joint between the inner tube and the connecting pipe can result in intermingling of the fluids circulating in the heat exchanger.

Those skilled in the art will appreciate that various changes and modifications may be made in our invention without departing from the spirit and the scope thereof. The essential characteristics of the invention are defined in the appended claims.

We claim:

1. In a heat exchanger having a pair of outer tubes and an inner hairpin tube having straight portions concentric with the outer tube and extending within the outer tubes for a substantial portion of their length and being substantially non-rotatable with respect to the outer tube, unions for non-rotatably connecting the straight portions of the inner tubes to the outer tubes each union comprising a stop within and near the end of the outer tube having a continuous annular inwardly facing surface extending at a substantial angle to the axis of the outer tube and an outwardly facing sealing surface permanently secured in leakproof relation to the outer tube, an enlarged end fitting on the inner tube having a stop adapted to engage and radially overlap the continuous annular surface of the stop on the outer tube to limit outward movement of the inner tube with respect to the outer tube, said fitting having an outwardly facing sealing surface of lesser diameter than and disposed adjacent the sealing surface on the outer tube when said stops are in engagement with each other, a portion of lesser diameter than the sealing surface on said fitting extending outwardly away from said sealing surfaces, a clamping element removably disposed on said portion, means engaging said fitting to draw said element toward said sealing surfaces, a sealing ring engaged by said element and engaging both said sealing surfaces whereby when said element is drawn toward said sealing surfaces said sealing ring is sealed against both said sealing surfaces and said stops are clamped together, the maximum outer dimensions of said portion of lesser diameter and the minimum internal diameters of said element and said sealing ring being such that said element and said sealing ring can be removed from said portion, and said fitting and said inner tube can be moved inwardly with respect to said outer tube to permit removal of said inner tube from said outer tube.

2. In a heat exchanger having an outer tube and an inner tube extending within the outer tube for a substantial portion of its length and being substantially non-rotatable with respect to the outer tube, a union for connecting the inner tube to the outer tube comprising a stop within and near the end of the outer tube and an outwardly facing sealing surface on the outer tube, an enlarged end fitting permanently secured in leakproof relation to the inner tube having a continuous annular stop adapted to engage and overlap the stop on the outer tube to limit outward movement of the inner tube with respect to the outer tube, the diameter of the stop on the inner tube being greater than the diameter of the sealing surface on the outer tube, said fitting having an outwardly facing sealing surface of lesser diameter than and disposed adjacent the sealing surface on the outer tube when said stops are in engagement with each other, a portion of lesser diameter than the sealing surface on said fitting extending outwardly away from said sealing surfaces, a clamping element removably disposed on said portion, screws threaded in said fitting and engaging said element to draw said element toward said sealing surfaces, a sealing ring engaged by said element and engaging both said sealing surfaces whereby when said element is drawn toward said sealing surfaces said sealing ring is sealed against both said sealing surfaces and said stops are clamped together, the maximum outer dimensions of said portion of lesser diameter being smaller than the minimum internal diameters of said element and said sealing ring whereby said element and said sealing ring can be removed from said portion and said fitting and said inner tube can be moved inwardly with respect to said outer tube to permit removal of said inner tube from said outer tube.

3. In a heat exchanger having an outer tube and an inner tube extending within and concentric with the outer tube for a substantial portion of its length and being substantially non-rotatable with respect to said outer tube, a union for connecting the inner tube to the outer tube comprising a stop within and near the end of the outer tube and an outwardly facing sealing surface on the outer tube, an enlarged end fitting permanently secured in leakproof relation to the inner tube having a stop adapted to overlap and engage the stop on the outer tube to limit outward movement of the inner tube with respect to the outer tube, the diameter of the stop on the inner tube being greater than the diameter of the sealing surface on the outer tube, said fitting having an outwardly facing sealing surface of lesser diameter than and disposed adjacent the sealing surface on the outer tube when said stops are in engagement with each other, a threaded portion of lesser diameter than the sealing surface on said fitting extending outwardly away from said sealing surfaces, a clamping nut threaded on said threaded portion, a sealing ring engaged by said nut and engaging both said sealing surfaces whereby when said nut is screwed toward said sealing surfaces said sealing ring is sealed against both said sealing surfaces and said stops are clamped together, the maximum outer dimensions of said threaded portion and the minimum internal diameters of said nut and said sealing ring being such that said element and said sealing ring can be removed from said portion and said fitting and said inner tube can be moved inwardly with respect to said outer tube to permit removal of said inner tube from said outer tube.

4. In a heat exchanger having an outer tube and an inner tube concentric therewith and extending within the outer tube for a substantial portion of its length and being substantially non-rotatable with respect to said outer tube, a union for connecting the inner tube to the outer tube and to a connecting pipe comprising an inwardly extending flange fixed to the outer tube providing a continuous annular inwardly facing shoulder within and near the end of the outer tube and an outwardly facing sealing surface, an enlarged end fitting permanently secured in leakproof relation to the inner tube having a continuous annular outwardly facing shoulder of larger diameter than and adapted to engage and overlap the inwardly facing shoulder on the outer tube to limit outward movement of the inner tube with respect to the outer tube, said fitting having an outwardly facing sealing surface of lesser diameter than and disposed immediately adjacent the sealing surface on the outer tube when said shoulders are in engagement with each other, a portion of lesser diameter than the sealing surface on said fitting extending outwardly away from said sealing surfaces, a clamping element removably disposed on said portion, means engaging said fitting to draw said element toward said sealing surfaces, a sealing ring removably disposed on said portion engaged by said element and engaging both said sealing surfaces whereby when said element is drawn toward said sealing surfaces said sealing ring is sealed against both said sealing surfaces and said shoulders are clamped together, means for connecting said portion of said fitting to the connecting pipe, the maximum outer dimensions of said portion of lesser diameter including the part of said connecting means permanently secured thereto and the minimum internal diameters of said element and said sealing ring being such that said element and said sealing ring can be removed from said portion when said connecting means is disconnected and said fitting and said inner tube can be moved inwardly with respect to said outer tube to permit removal of said inner tube from said outer tube.

5. A device according to claim 4 wherein said connecting means comprises a clamping ring on said connecting pipe and screw means engaging said outer tube for urging said clamping ring toward said portion of said fitting.

6. A device according to claim 4 wherein said connecting means comprises a clamping ring on said connecting pipe and screw means engaging said clamping element for urging said clamping ring toward said portion of said fitting.

7. A union for connecting an inner tube to an outer concentric tube and to a connecting pipe, said inner tube being substantially non-rotatable with respect to said outer tube, said union comprising an inwardly extending flange on the outer tube providing a continuous annular inwardly facing shoulder within and near the end of the outer tube and an outwardly facing conical sealing surface at the end of the outer tube, an enlarged end fitting permanently secured in leakproof relation to the inner tube having an outwardly facing continuous annular shoulder of greater diameter than said inwardly facing shoulder on the outer tube and adapted to engage said inwardly facing shoulder to limit outward movement of the inner tube with respect to the outer tube, an outwardly facing sealing surface of lesser diameter than the sealing surface on the outer tube extending substantially at right angles to and disposed immediately adjacent the sealing surface on the outer tube when said shoulders are in engagement with each other, a threaded portion of lesser diameter than the sealing surface on said fitting, a portion of reduced diameter and an outwardly extending end flange adapted to make sealing engagement with the connecting pipe, said outwardly extending end flange having an outer diameter less than the diameter of said threaded portion, a nut on said threaded portion, a gasket engaged by the nut and engaging both said sealing surfaces whereby when said nut is tightened said gasket is sealed against both said sealing surfaces and said shoulders are clamped together, a split ring engaging said end flange and surrounding said portion of reduced diameter, and a clamping ring engaging said split ring and adapted to be secured to a corresponding clamping ring on said connecting pipe to urge said connecting pipe into sealing engagement with said end flange, said nut, said gasket and said clamping ring having openings of greater diameter than said end flange and being removable over said end flange when said split ring is removed, whereby said fitting and said inner tube can be moved inwardly with respect to said outer tube to permit removal of said inner tube from said outer tube.

References Cited in the file of this patent
UNITED STATES PATENTS

| | | |
|---|---|---|
| 1,068,742 | Dahl | July 29, 1913 |
| 1,400,541 | Hansen | Dec. 20, 1921 |
| 2,298,511 | Rathbun | Oct. 13, 1942 |
| 2,337,221 | Allen | Dec. 21, 1943 |
| 2,424,221 | Brown | July 22, 1947 |
| 2,449,052 | Brown | Sept. 14, 1948 |

UNITED STATES PATENT OFFICE
CERTIFICATE OF CORRECTION

Patent No. 3,018,090 January 23, 1962

Robert W. Kaase et al.

It is hereby certified that error appears in the above numbered patent requiring correction and that the said Letters Patent should read as corrected below.

In the grant, lines 2 and 12, and in the heading to the printed specification, line 4, for "Fintube Company", each occurrence, read -- Brown Fintube Company --.

Signed and sealed this 15th day of May 1962.

(SEAL)
Attest:

ERNEST W. SWIDER
Attesting Officer

DAVID L. LADD
Commissioner of Patents